US006739095B2

(12) United States Patent
Glynos

(10) Patent No.: US 6,739,095 B2
(45) Date of Patent: May 25, 2004

(54) TENT WITH ANCHORS

(76) Inventor: Peter N. Glynos, 8 Oak Knoll La., Bedminster, NJ (US) 07921

( * ) Notice: Subject to any disclaimer, the term of this patent is extended or adjusted under 35 U.S.C. 154(b) by 0 days.

(21) Appl. No.: 10/301,039

(22) Filed: Nov. 21, 2002

(65) Prior Publication Data
US 2003/0140569 A1 Jul. 31, 2003

Related U.S. Application Data

(63) Continuation-in-part of application No. 10/057,208, filed on Jan. 25, 2002.

(51) Int. Cl.$^7$ ................................................ E04D 5/00
(52) U.S. Cl. ................................. 52/4; 52/3; 248/910
(58) Field of Search ..................... 52/4, 2.19, 2.22, 52/2.25, 2.11, 302.1, 302.3, 102, 155, 3, 2.13, 2.23; 248/529, 910

(56) References Cited

U.S. PATENT DOCUMENTS

| 3,862,876 A | * | 1/1975 | Graves .......................... 428/83 |
| 4,033,367 A | | 7/1977 | Johnston |
| 4,122,637 A | * | 10/1978 | Runge et al. .................... 52/3 |
| 4,455,790 A | * | 6/1984 | Curle ............................. 52/4 |
| 4,759,545 A | * | 7/1988 | Grable ......................... 473/481 |
| 5,020,764 A | * | 6/1991 | Yamamoto .................... 248/529 |
| 5,176,421 A | | 1/1993 | Fasiska |
| 5,579,794 A | | 12/1996 | Sporta |
| 5,676,168 A | | 10/1997 | Price |
| 5,816,278 A | | 10/1998 | Kim |
| 5,944,040 A | | 8/1999 | Jang |
| 6,363,661 B1 | * | 4/2002 | Myers .......................... 52/2.13 |

FOREIGN PATENT DOCUMENTS

GB   2206024 A  * 12/1988 ...................... 52/4

* cited by examiner

Primary Examiner—Ramon O. Ramirez
(74) Attorney, Agent, or Firm—Kenneth P. Glynn, Esq.

(57) ABSTRACT

The present invention is directed to an outdoor tent, which includes of a flat, flexible sheet material for its main body. Along the peripheral edge (i.e. near the bottom edge) or along each of at least two of the plurality of edges, there is at least one, and preferably, a plurality of tank compartment anchors, each having at least one fill orifice and closure means for the fill orifice. The plurality of tank compartment anchors are hollow, flexible tank compartment anchors, and, in preferred embodiments, the tank compartment anchors and sheet material are formed of the same material. In some preferred embodiments, the tank compartment anchors also have drain plugs.

10 Claims, 4 Drawing Sheets

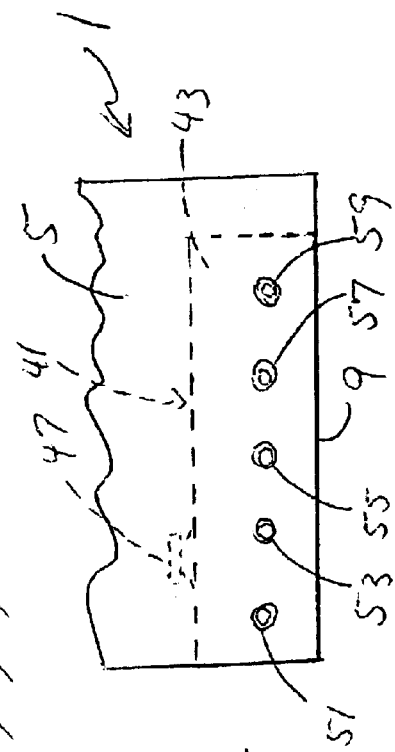
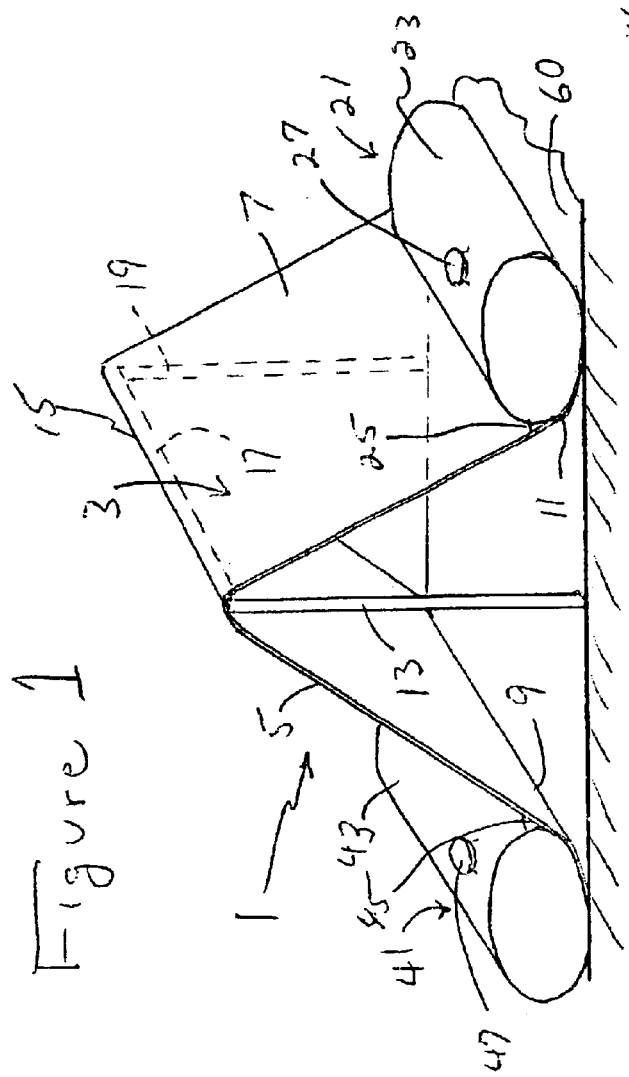

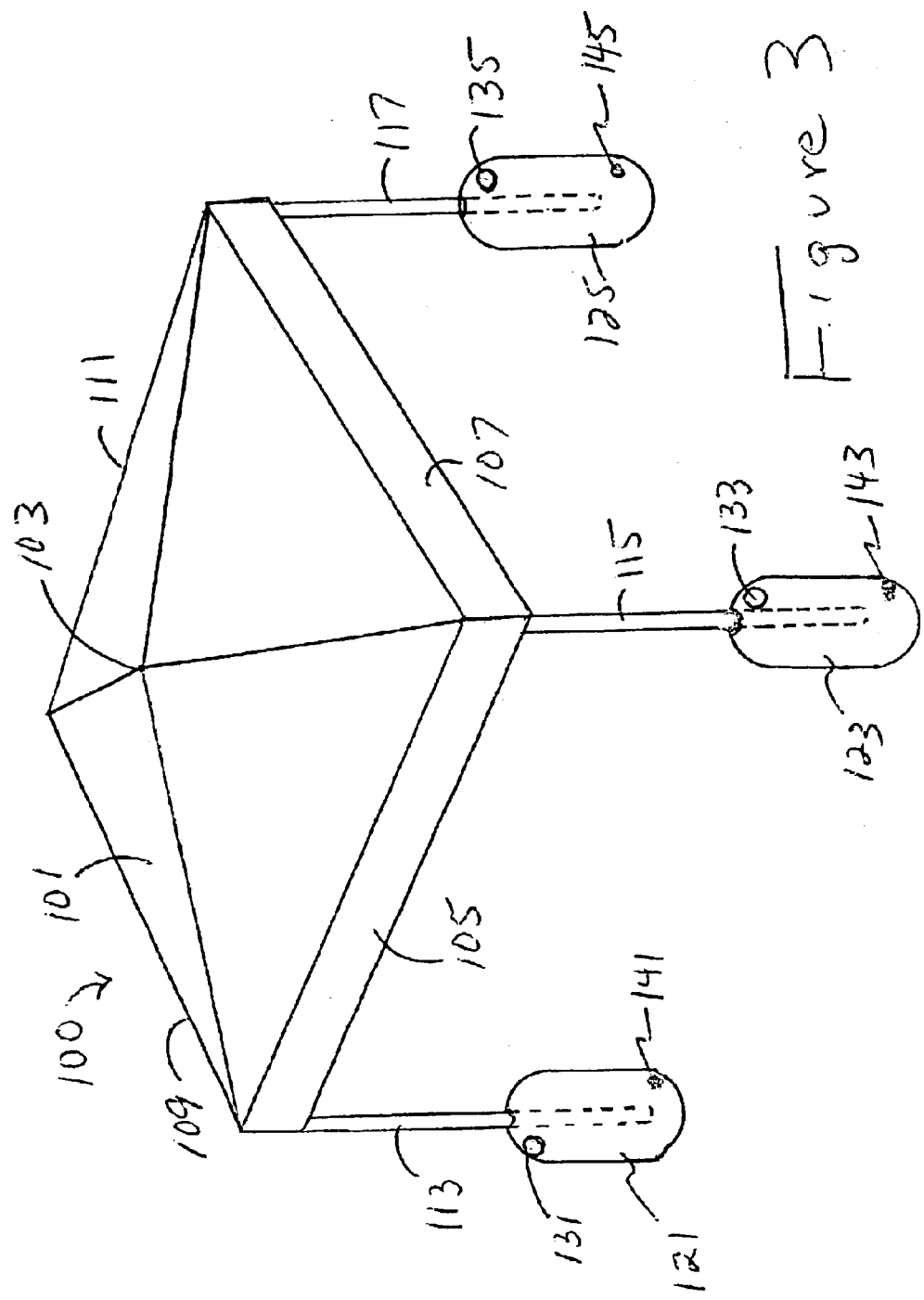

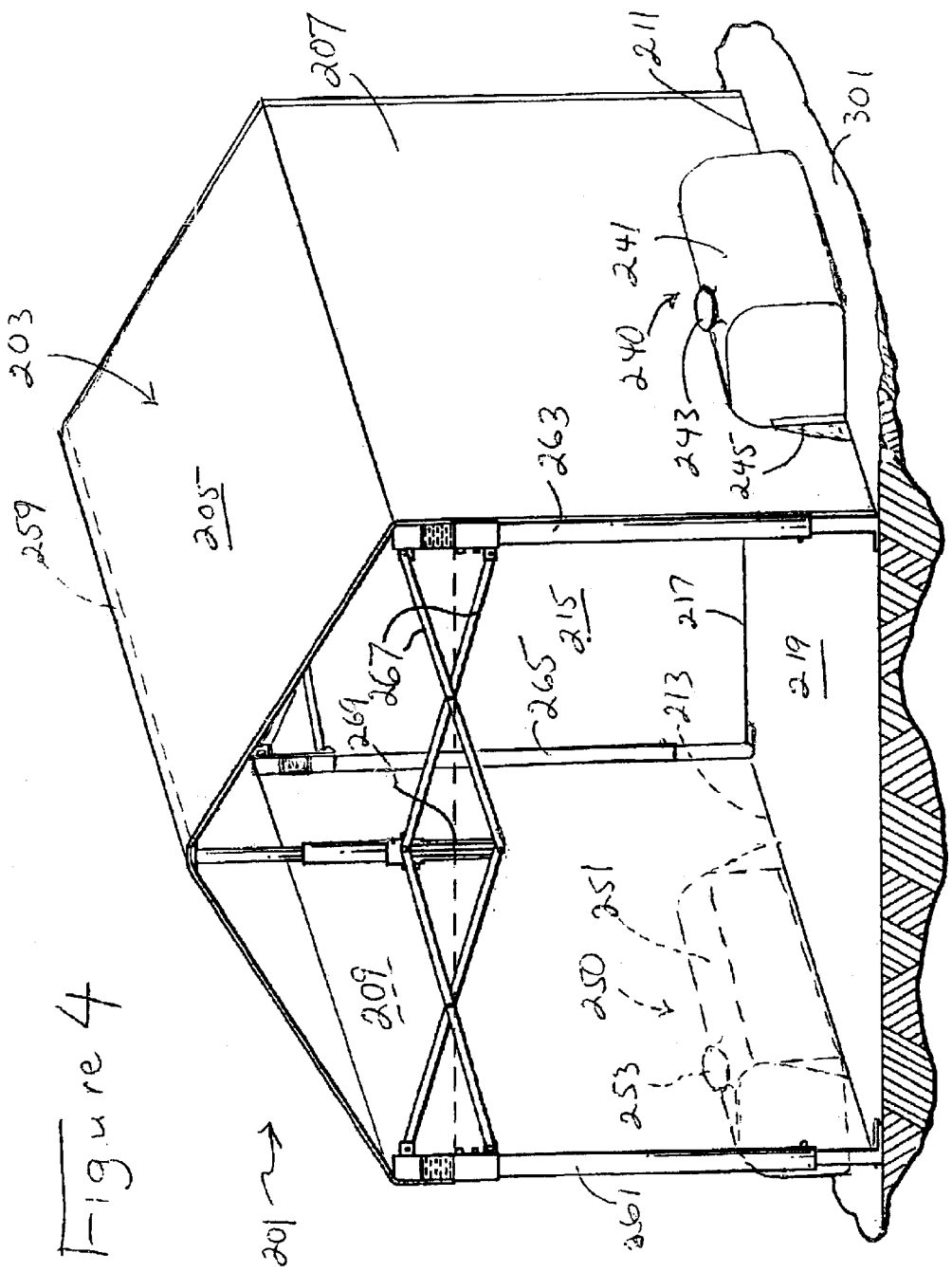

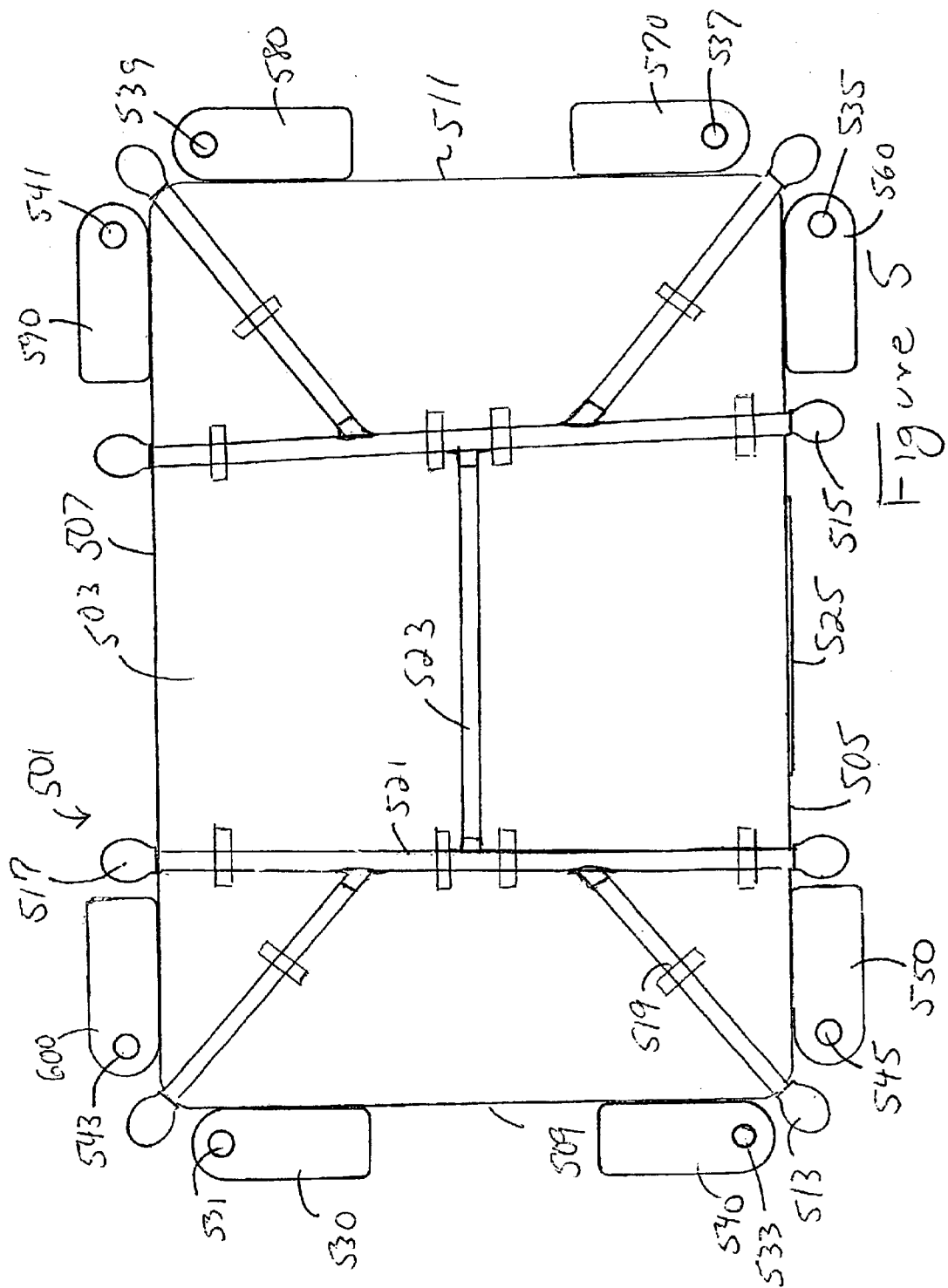

TENT WITH ANCHORS

REFERENCES TO RELATED CASES

This application is a continuation-in-part of copending U.S. patent application Ser. No. 10/057,208, entitled "Protective Tarp With Anchors", filed on Jan. 25, 2002, by the inventor herein.

BACKGROUND OF THE INVENTION

1. Field of the Invention

The present invention relates to outdoor tents for camping and outdoor events, such as wedding parties, store tent sales, etc. More specifically, it relates to outdoor tents that do not require pegs or other in-ground attachments, and utilize anchors formed of tank compartments, which may be filled with fluent material. In some preferred embodiments, the tank compartment anchors are integrally formed with the tent sheet material.

2. Information Disclosure Statement

The following patents are exemplary of the prior art relating to anchoring of tarps and tents:

U.S. Pat. No. 4,033,367 describes a tent fumigation apparatus that is for placement over a building to allow fumigation of the building by introducing fumigating gas into the tent. The preferred tent includes pie-shaped sections, at least some of which have ties allowing sections to be tied off for reducing the size of the tent and conforming it to the shape of the building. Tube means is provided to be affixed to the bottom of the tent for sealing purposes. The tent may include a lifting structure at the top and a cover for closing an opening at the lifting structure. At least one slot is provided in the tent for entrance and egress.

U.S. Pat. No. 4,455,790 describes a tarpaulin anchoring system for retaining a tarpaulin on a pile of stored grain or other granular material that comprises of a plurality of anchors embedded in the pile. Each anchor has an attachment element protruding upwardly from the pile, with the attachment element being connected to a fastener affixed to the underside of the tarpaulin. The anchors are placed in the grain pule, throughout the area covered by the tarpaulin, as required to retain it in place. The anchors themselves may be of a screw or auger type which can be driven into an existing grain pile and attached to a tarpaulin as it is spread over the pile. In the case where a tarp is suspended above a grain storage area prior to formation of the grain pile, the anchors may be discs or plates attached to the underside of the tarpaulin by ropes; the anchors are buried in the pile when formed.

U.S. Pat. No. 5,176,421 describes a cover system for an automobile which includes a flexible cover, preferably of nylon, having leading, tailing and side edge portions and of a suitable dimension to fit over the entire car body from rear bumper to the front bumper and sides thereof. The flexible cover includes an elastic leader segment attached at a first end to the cover and spaced from the trailing edge thereof. A second end of the leader segment is attached to a rotatable spool housed in a containment tube. The spool is rotated for storing in the cover by a motor, by a spring-biased shaft arrangement or by a manually turnable crank or combinations thereof. The containment tube may be pivotally swung outwardly from the trunk to an operable position at the rear of the trunk lid. After the cover in applied to the automobile, the containment tube is swung back to the trunk compartment for safe storage.

U.S. Pat. No. 5,579,794 describes a method for shielding, anchoring and containing an object such as a trailer or motor home in gale-force winds. A wind-permeable perforate sheet extends downwardly and outwardly from the top of the object or the roof of a home at an acute angle so as to surround a substantial portion of each of the sides with an inclined wind-permeable planar surface. The sheet is anchored to helical ground anchors via mechanical attachments which may also be used to tighten the sheet over the object or home. Apparatus for shielding, anchoring and containing an object such as a trailer of motor home in gale-force winds is also disclosed.

U.S. Pat. No. 5,676,168 describes a fast-erecting tent in which several open-ended arcuate interconnect via a single connector. The frame of the tent includes 1) a pair of resilient, planar open-end arcuate sections that form a filiform base loop; 2) a pair of resilient open-end arcuate sections that from a filiform upper lop; 3) a connector which links a terminal end of the first arcuate section of the base loop plus a terminal end of the first arcuate section of the upper loop to the terminal end of the second arcuate section of the base loop plus the terminal end of the second arcuate section of the upper loop; and 4) a segmented, internally biased, arch shaped tubular strut. He ends of the strut are slidably and rotatably connected to the arcuate sections of the base loop. The strut is connected to the arcuate sections of the upper loop by means of a twist clip. The fabric covering is wrapped around and attached to the frame by conventional means. The connector is a sleeve with a through-bore. Through-bar having a cross-section of multiple, parallel, partial, interconnected, right circular cylinders and is designed so that the terminal ends of the arcuate sections forming the filiforms loops can be retained in the through-bore mainly by friction. The terminal ends of the arcuate sections that form the filiform loops are permanently fixed within the through-bore at a first end of the connector but are free to slide, rotate, and swivel in and be detached from a second end of the through-bore. Both the base loop and upper loop can be either elliptical or semi-elliptical.

U.S. Pat. No. 5,816,278 describes a tent including a closed loop resilient coilable member, the member being distorted to form at least three support loops. Each support loop adjoins the other support loops along a single portion of its perimeter with the support loops having a common adjoining region. Each support loop has a perimeter substantially the same as that of the other support loops and a membrane attached to the perimeter of the support loop. The membrane extends between the opposing portions of the support loop to restrain the support loop. The tent further includes a base membrane attached to the perimeters of the support loops and extending between the support loops to restrain the support loops in relation to one another. When the tent is expanded, the support loops are in spaced relation to one another around the common adjoining region and are restrained by the membranes. The common adjoining region forms an apex of the tent and the membranes define walls and a base of the tent. When the tent is fully collapsed, the support loops form overlapping loops over one another that are coiled.

U.S. Pat. No. 5,944,040 describes a tent frame that has a center pole used for stretching and sustaining a tent's roof when pitching a tent. A plurality of side poles are coupled to each other through a plurality of scissor-type ribs, with upper ends of the ribs being hinged to connectors provided at top ends of the side poles and lower ends of the ribs being hinged to sliders movably fitted over the side poles. The center pole is coupled to the connectors of the side poles through a plurality of center pole ribs. The above center pole ribs individually consist of two rib members, which are coupled to each other through a hinge joint. Each of the center pole ribs is also hinged to the slider of an associated side pole through a support link, thus being collapsible at the hinge joint in accordance with a sliding motion of the slider along the side pole.

Notwithstanding the prior art, the present invention is neither taught nor rendered obvious thereby.

SUMMARY OF THE INVENTION

The present invention is directed to an outdoor tent having its own upward support structure, having sidewalls, with a separate top or forming a top, made of flexible sheet material, with a plurality of bottom edges. Along at least two of the plurality of bottom edges, there is at least one, and preferably, a plurality of tank compartment anchors that have at least one fill orifice and closure means for the fill orifice. In one preferred embodiment, there is at least one such tank compartment anchors on each side of the tent.

The plurality of tank compartment anchors are hollow, flexible tank compartment anchors, and, in some preferred embodiments, the tank compartment anchors and sheet material are formed of the same material as the tent. In other embodiments, the tank compartment anchors are made of materials different from the tent material. The tank compartment anchors may have any shape, or size, and rectangular shapes are most easily foldable and balanced.

The tent sheet material may also take any tent shape desired, and, in some preferred embodiments, the tent is rectangular from a top view and has four edges, having two bottom edges, being two opposite edges. This would be a basic pup tent with an open front and an open back. There are at least two bottom edges opposite one another, and in some preferred embodiments, there is at least a back sheet with a third bottom edge. Some most preferred embodiments include a front, a back, sides and, in some embodiments, a bottom sheet. These tents have openings, at least in the front to create an entranceway. The sidewalls, back and even the front may contain a plurality of tank compartment anchors.

In many preferred embodiments, the present invention tent includes tank compartment anchors that are preferably aligned in a row parallel to an edge.

BRIEF DESCRIPTION OF THE DRAWINGS

The present invention should be more fully understood when the specification herein is taken in conjunction with the drawings appended hereto wherein:

FIG. 1 shows an oblique front view of a present invention tent having connected tank compartment anchors that are permanently attached to the tent's sidewalls;

FIG. 2 shows a partial inside view of a sidewall of the present invention tent shown in FIG. 1;

FIG. 3 shows an oblique view of a present invention party tent having tank compartment anchors removably attached to the tent's cornerposts;

FIG. 4 shows an oblique front view of another present invention tent having sidewalls, a back and a front with tank compartment anchors velcro-attached to the sidewalls; and, FIG. 5 shows a top view of another present invention tent utilizing eight tank compartment anchors.

DETAILED DESCRIPTION OF THE PRESENT INVENTION

FIG. 1 shows an oblique front view of a present invention tent 1, having connected tank compartment anchors 21 and 41 that are permanently attached to the tent's sidewalls 5 and 7. Resting on ground 60 is tent 1 made of flexible sheet material 3, forming sidewalls 5 and 7. Sidewall 5 has a bottom edge 9 and sidewall 7 has a bottom edge 11. These are respectively permanently attached to tank compartment anchors 41 and 21. These tank compartment anchors 21 and 41 have flexible, collapsible main bodies 23 and 43, that are waterproof, and include sealable caps 27 and 47. They are attached to sidewalls 5 and 7 by, for example adhesive, riveting, heat-sealing or other connecting means, e.g., at connection points 25 and 45.

Tank compartment anchors 21 and 41 may be filled with water, sand, small stones, other liquids or other available fluid materials. Poles 13 and 19 along with cross member 17 support top 15 of tent 1 and, hence, in conjunction with anchors 21 and 41, maintain an open tent structure as shown.

FIG. 2 shows a partial inside view of sidewall 5 of the present invention tent 1 shown in FIG. 1. Parts identical to those in FIG. 1 are identically numbered. Here, tank compartment anchor 41 is attached to tent sidewall 5 at its bottom edge 9 via grommets 51, 53, 55, 57 and 59, which may be sealed and coated. When tank compartment anchors 21 and 41 are emptied (and flattened) they may be rolled up with the sidewalls 5 and 7 to form a single, collapsed tent structure that may be bagged for easy transport.

FIG. 3 shows an oblique view of a present invention party tent 100 having four tank compartment anchors removably attached to the tent's corner posts. Tent 100 has four open sides and a single piece top 101 formed to peak at center 103 and includes side borders 105, 107, 109 and 111. A frame structure located underneath top 101 is a standard scissor-like pyramid frame connected to corner posts 113, 115 and 117, and a fourth corner post hidden from view. Each corner post is removably inserted into tank compartment anchors such as anchors 121, 123 and 125 shown in the Figure. These anchors have removable caps 131, 133 and 135, respectively. They may be formed of rigid or flexible material and may be permanently attached or removably attached. By use of these anchors, a party tent may be set up and anchored without the need or use of any ground-penetrating anchoring members. This eliminates the need for hammers or other tools and eliminates the need for penetrable ground. Thus, the present invention tents may be set up on patios, swimming pool decks, parking lots etc. In order to easily remove fluid materials from the tank compartment anchors, optional drain plugs such as drain plugs 141, 143 and 145 may be included. In fact, these may be included on any embodiment of the present invention.

FIG. 4 shows an oblique front view of another present invention tent 201 having sidewalls 207 and 209, a back 215, a top 203 and a front (removed for illustration purposes). The front would have a slit doorway that could be opened and closed for easy access. There is also a bottom 219 and an internal structural support system. Top 203 has two sections such as section 205 and other features, such as vents and plastic windows with flexible screens could also be included. Tank compartment anchors 240 and 250 are VELCR0-. i.e. hook and loop fasteners, attached, such as with VELCR0, i.e. hook and loop fasteners, attachment 245, to the sidewalls 207 and 209. These VELCRO attachments (commonly known as hook and loop fasteners) are generally located near bottom edges such as bottom edges 211 and 213. The tank compartment anchors include waterproof main bodies 241 and 251 with caps 243 and 253. They may be flexible or rigid and are preferably flexible so as to be collapsible.

A third tank compartment anchor may be attached to bottom edge 217 of back 215. By use of these tank compartment anchors, tent 201 may be set up on ground 301 without ground penetrating anchors and the surface may be almost any solid surface such as macadam, concrete or patio block. The mechanical support system involves four corner posts such as corner posts 261, 263 and 265 a front center post 269 and a rear center post (not shown), a transverse top support 259 and scissor-type cross supports 267.

FIG. 5 shows a top view of another present invention tent 501 utilizing eight tank compartment anchors 530, 540, 550, 560, 570, 580, 590 and 600. These have fill caps 531, 533, 545, 535, 537, 539, 541 and 543, respectively.

Tent 501 has a top 503, sides 509 and 511, a back 507 a front 505 and a front door 525. These are all formed of flexible sheet material and are preferably waterproof. The tank compartment anchors are attached in the location as shown and may be permanently or removably attached, but are preferably permanently attached. They may be flexible (collapsible) or rigid, and are preferably flexible.

Tent 501 has an external support system made up of vertical posts such as corner post 513, front post 515 and back post 517. They are connected by cross members such as corner bar 519, traverse bar 521 and center bar 523. The sidewalls 509 and 511, frontwall 505 and backwall 507 terminate at their bottom edges in connection with a bottom member (not showing)

Obviously, numerous modification and variations of the present invention are possible in light of the above teachings. It is therefore understood that within the scope of the appended claims, the invention may be practiced otherwise than as specifically described herein.

What is claimed is:

1. A outdoor tent with anchors that do not penetrate ground, which comprises:

(a) at least one flexible sheet material forming two sides of a tent and having at least two bottom edges wherein said flexible sheet material is broad and continuous such that any part of said flexible sheet material may be passed over from any other part of said flexile material by always remaining on said flexible sheet material, (b) an upward support structure connectable to said flexible sheet material to support same in an unfolded tent format; and, (c) at least one tank compartment anchor located along at least one bottom edge, said tank compartment anchor having at least one fill orifice and having closure means for said at least one fill orifice.

2. The outdoor tent of claim 1 wherein said at least one tank compartment anchor is a hollow, flexible tank compartment anchors.

3. The outdoor tent of claim 2 wherein said at least one tank compartment anchor and said sheet material are formed of the same material.

4. The outdoor tent of claim 1 wherein said sheet material is rectangular from a top view and has four edges, two of said four edges being opposite bottom edges.

5. The outdoor tent of claim 4 that further includes a back section connected to one of said four edges that is not a bottom edge.

6. The outdoor tent of claim 1 wherein said tent includes a front and a back and said front has a door opening for passage threrethrough, and has at least one tank compartment anchor located on at least said back.

7. The outdoor tent of claim 6 that further includes a floor connected to said sidewalls, said front and said back.

8. The outdoor tent of claim 1 wherein said upward support structure includes at least one pole adapted for connection to said sheet material under said sheet material so as to support said tent from its inside.

9. The outdoor tent of claim 8 wherein there are a plurality of poles to support said tent from its inside.

10. The outdoor tent of claim 1 wherein said upward support structure includes at least one traversing structure adapted for connection to said sheet material atop said sheet material so as to support said tent from its outside.

* * * * *